March 2, 1937.                H. W. HILL                2,072,593
                            OPHTHALMIC LENS
              Original Filed Nov. 24, 1930    2 Sheets-Sheet 1
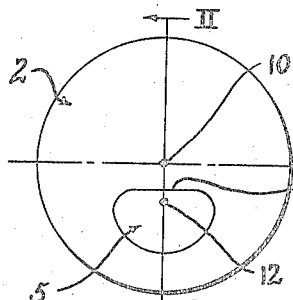 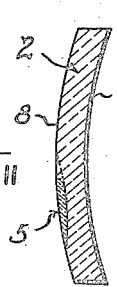 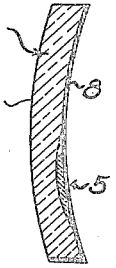 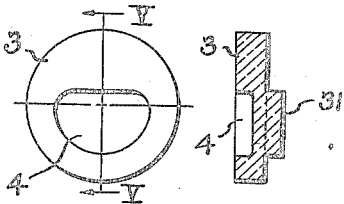
Fig. I.     Fig. II.   Fig. III.   Fig. IV.   Fig. V.
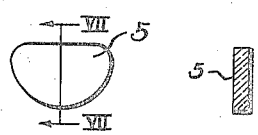 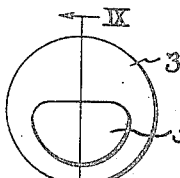 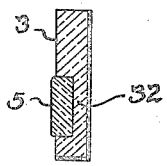 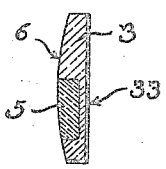
Fig. VI.   Fig. VII.   Fig. VIII.   Fig. IX.   Fig. X.
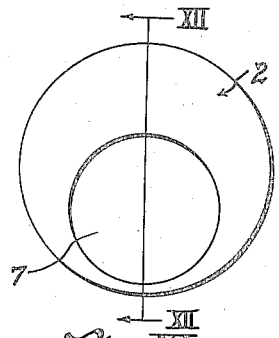 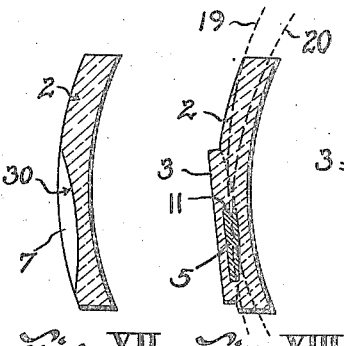 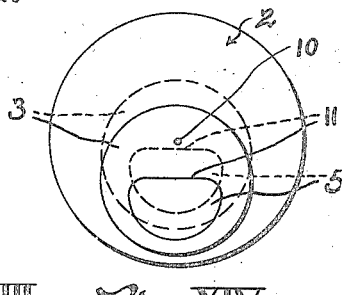
Fig. XI.   Fig. XII.   Fig. XIII.   Fig. XIV.
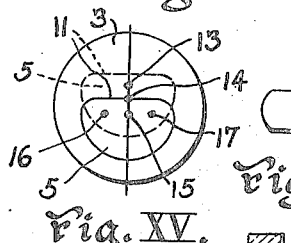 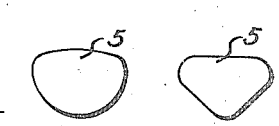
Fig. XV.   Fig. XVI.   Fig. XVII.   Fig. XVIII.   Fig. XIX.   Fig. XX.
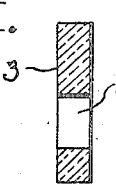
Fig. XXI.
INVENTOR
Harry W. Hill.
BY Harry H. Stull
ATTORNEY

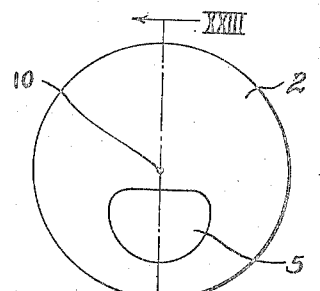 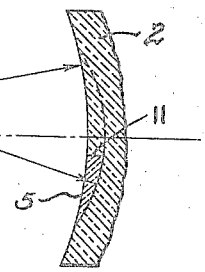
Fig. XXIII                Fig. XXIII
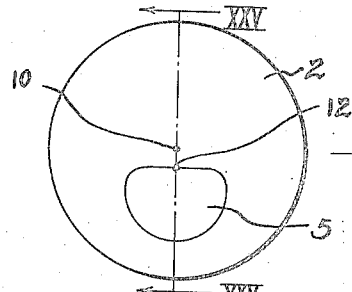 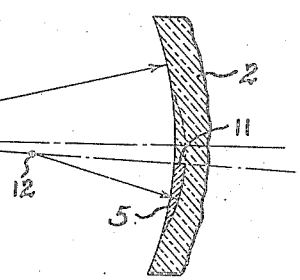
Fig. XXIV                Fig. XXV
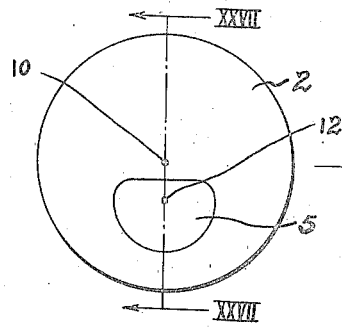 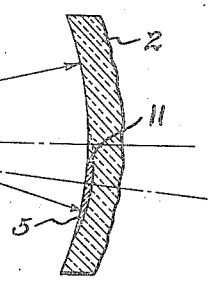
Fig. XXVI                Fig. XXVII Patented Mar. 2, 1937

2,072,593

UNITED STATES PATENT OFFICE 2,072,593

OPHTHALMIC LENS

Harry W. Hill, Southbridge, Mass., assignor to American Optical Company, Southbridge, Mass., a voluntary association of Massachusetts Application November 24, 1930, Serial No. 497,862
Renewed March 25, 1936

7 Claims. (Cl. 88—54)

This invention relates to improvements in ophthalmic lenses and has particular reference to an improved bifocal or multifocal lens and the process of making the same.

The principal object of the invention is to provide improved means of controlling the size, shape, dispersion and optical center of the reading addition or inserted segment of a fused bifocal or multifocal lens and has particular reference to an improved process of making the same whereby the expensive grinding and polishing operations usual in the production of lenses of this character are greatly reduced in number and the ultimate cost of the lens also greatly reduced.

Another object of the invention is to provide improved means and an improved process for making a fused bifocal or multifocal lens having a composite countersink button of glass of a plurality of different indices of refraction whereby the difficult and commercially impracticable operation of fusing the edge between the parts of said button is overcome and made commercially and economically possible.

Another object of the invention is to provide an improved process of forming a bifocal or multifocal lens having odd shaped reading additions, particularly those of an irregular contour.

Another object of the invention is to provide improved means and processes wherein the position of the optical center of the reading segment with respect to the optical center of the distance portion of a fused bifocal or multifocal lens can be definitely controlled.

Another object is to provide a reading segment in a fused bifocal or multifocal lens that will be of such size and shape as to be best suited to vocational or other individual uses of the wearer.

Another object is to provide improved means and processes whereby the position of the dividing line between the reading and distance fields of such lenses can be controlled with respect to the optical centers of said fields.

Another object is to provide improved means and processes whereby the position of the optical center of the reading field with respect to the optical center of the distance field can be definitely controlled.

Another object of the invention is to provide improved means and processes of controlling the size of odd shaped segments or reading additions.

Another object is to provide simple, efficient and economical means for producing bifocal or multifocal lenses having incorporated therein a plurality of advantageous features which have hitherto been difficult to obtain in lenses of this character.

Other objects and advantages of this invention will become apparent from the following description taken in connection with the accompanying drawings and it will be understood that many changes may be made in the details of construction, arrangement of parts and steps of the process without departing from the spirit of the invention as expressed in the accompanying claims. I, therefore, do not wish to be limited to the exact details of construction and steps of the process shown and described as the preferred forms only have been shown by way of illustration.

Referring to the drawings:

Fig. I is a front elevation of a finished lens embodying the invention;

Fig. II is a section on line II—II of Fig. I;

Fig. III is a view similar to Fig. II showing the reading segment positioned on the opposite face or inner surface of the lens;

Fig. IV is a front elevation of the blank for the countersink button showing a step in the process of manufacture.

Fig. V is a sectional view taken on line V—V of Fig. IV;

Fig. VI is a front elevation of the segment for the reading addition;

Fig. VII is a sectional view taken on line VII—VII of Fig. VI;

Fig. VIII is a front elevation of the composite button showing a further step in the process of manufacture;

Fig. IX is a sectional view taken on line IX—IX of Fig. VIII;

Fig. X is a view similar to Fig. IX showing a further step in the process of manufacture;

Fig. XI is a front elevation of the major portion of the lens illustrating a further step in the process of manufacture;

Fig. XII is a sectional view taken on line XII—XII of Fig. XI;

Fig. XIII is a view similar to Fig. XII showing a further step in the process of manufacture;

Fig. XIV is a diagrammatic view illustrating how the position of the reading addition may be varied with respect to the center of the distance portion or major portion of the lens;

Fig. XV is a front elevation of a diagrammatic illustration showing how the position of the segment may be varied with respect to the geometrical center of the blank for the reading addition;

Fig. XVI is a front elevation of a modified form of segment for the reading addition;

Fig. XVII is a front elevation of another modified form of segment for the reading addition;

Fig. XVIII is a front elevation of a further modified form of segment for the reading addition;

Fig. XIX is a further modification of a segment for the reading addition;

Fig. XX is a further modification of a segment for the reading addition;

Fig. XXI is a sectional view similar to that shown in Fig. V, but illustrates a further modification in which a recess is formed through the minor disc instead of a slight depression as shown in Fig. V;

Fig. XXII is a front elevation of a finished lens embodying the invention;

Fig. XXIII is a section on line XXIII—XXIII of Fig. XXII;

Fig. XXIV is a view similar to Fig. XXII;

Fig. XXV is a section on line XXV—XXV of Fig. XXIV;

Fig. XXVI is a view similar to Fig. XXII; and

Fig. XXVII is a section on line XXVII—XXVII of Fig. XXVI.

It has been found from past experience that a fused bifocal or multifocal lens having a circular reading segment is not as efficient in many instances as some other special shape. It has however been considered impracticable if not commercially impossible to make many of these desired shapes in fused form, which shapes have been found desirable from experience with segments of the cemented form.

It has also been found from experience that where the countersink button of a fused bifocal or multifocal lens is made in composite form from a plurality of pieces of glass of different index of refraction that it has been most difficult if not commercially impracticable to fuse the edge between the sections of said composite button.

The prime objects therefore of the invention is to provide simple, efficient and economical means whereby a fused bifocal or multifocal lens having such a segment can be made for commercial use and in which is incorporated many advantages hitherto unobtainable in prior art lenses of this character both from a standpoint of the cost and practicability of production and of the optical excellence and appearance of the finished article.

Referring to the drawings in which similar reference characters denote corresponding parts throughout:—

The major lens blank 2 is made of crown or low index optical glass. There is made in this major blank a countersink recess 7 the undersurface 30—Fig. XII of which is finished to a curvature required by the desired reading addition of the lens. This surface 30 is preferably ground and polished or otherwise made to an optical surface. This blank 2 with the countersink 7 is similar to prior art constructions except that the diameter of the countersink 7 will probably be larger for the reasons hereinafter set forth.

The countersink button 3 is preferably made of glass sensibly the same as that of the major blank 2. This countersink button 3 is preferably made by pressing the same in a plastic condition in a mold. Into one surface of this button is pressed or made the recess 4 of the desired contour and size of the reading segment. It will be noted that on the side opposite the recess or depression 4 is a projection or exuberance 31, and also that the depression 4 does not extend entirely through the button 3. The button 3 is made with the projection 31 in order that when the recess or depression 4 is formed the laminations of the glass are moved or displaced sensibly parallel with themselves, whereas if the projections were not used and the underside or projection side left flat the laminations of the glass would be curled or displaced out of parallelism and produce irregularities in the blank which would be visible at times and would appear as lines, seams, veins, cords, cracks and defects which would destroy the value of the lens. It is clear that when the glass of the button 3 is displaced when the recess 4 is pressed therein that there is a tendency for the displaced glass to spread laterally if the projection 31 were not incorporated to take care of this displacement. If the depression 4 went clear through the button 3 the shape and outline of the depression could not be so well controlled and the sides of the recess would not be so smoothly finished, and there would be no layer of glass left to protect the higher index segment, to be described hereafter, and which is to be pressed into the depression 4.

The reading segment 5 is made of a glass of higher index of refraction than that of the major blank 2 or countersink button 3. This glass may be flint or other high index optical glass such as barium crown, etc. This segment 5 may be formed by molding it in plastic state to the required size and shape, or it may be cut out to shape and size and if desired the edges smoothed and polished.

The reading segment 5 is placed in the recess 4 of the countersink button 3. It may be put in loosely and fused. The segment may be placed in the recess under pressure if necessary. The segment may also be made by taking a strip or gob of glass and placing it over the recess 4 while the button 3 is still in the mold and at high temperature, the strip or gob is also in plastic condition, and forcing a portion thereof into the recess by a suitable plunger. It is clear that the reverse of these operations may also be used. When the segment 5 is placed loosely in the recess 4 proper clearance between the edges of the segment and button must be provided.

It will be noted, Fig. IX, that as the recess 4 does not extend entirely through the button 3 there is a protective layer of low index glass 32 over the under face of the high index glass 5. This feature of protecting the underside of the higher index segment by a support 32 of lower index glass insures the fusion of the composite button of Fig. X into the countersink 7 and prevents aberration, shrinkage and warping of the segment 5. With the face 33, Fig. X of the composite button all of the same index of refraction as the major blank 2 the fusion takes place with less liability of warping the countersink curve 7 than is usual where different kinds of glass are exposed; and also there is less of the higher index and more expensive material 5 used.

The projection 31 of the button 3 is removed or ground off, and the opposite side is finished to curve 6 to fit in the countersink 7, see Fig. X. The composite button of Fig. X is placed in the countersink 7 of the major blank 2, the segment 5 side down and the parts fused or otherwise secured together as shown in Fig. XIII. That portion of glass which was the countersink button 3 in which the segment 5 was placed blends with the major portion 2 and disappears. This is due to the fact that it is sensibly of the same index of refraction as the major portion and when fused thereto becomes invisible, leaving only the high index portion 5 visible. A curve 8 is then formed on the segment side of the lens to any desired curvature depending upon the distance power required. This removes the excess glass from that side of the lens blank and prepares it for commercial use. The curve 8 and segment 5 are shown in Fig. II as being placed upon the convex side of the lens and in Fig. III as being placed on the concave side of the lens, it being understood that either side can be used. The lens is then finished by placing the desired curve on the opposite face 9 of the lens.

It is apparent that the size and shape of the reading segment can be controlled during the forming of the recess 4 and the segment 5, it being simply necessary to employ different shaped moulding dies and different shaped segments 5 to fit the recesses 4 formed by said dies. A few of the different shaped segments 5 are shown in Figs. XVI to XX inclusive and it is to be understood that any variation in the sizes and shapes of the segments shown may be made. The position of the reading segment 5 with respect to the major portion 2 may be controlled by the position at which the countersink 7 is ground into the major lens blank 2 and also by the way the major blank 2 is finally cut and shaped. If it is desired to place the segment 5 closer to the center 10 the countersink 7 is ground closer to said center and if it is desired to place the segment 5 further away from the center 10 the countersink 7 is ground closer to the edge of the major portion 2. In this manner the dividing line 11 between the major and minor fields of the lens may be positioned in any desired relation with the center 10. A diagrammatic illustration of attaining this result is shown in Fig. XIV. The varying of the position of the segment 5 with respect to the center 10 of the major portion 2 may also be controlled by varying the position of the recess 4 in the countersink button 3 as shown in Fig. XV. By placing the recess nearer the top of the button 3 it is apparent that when said button is fused within the countersink 7 of the major portion 2 the dividing line 11 will be nearer the center 10 and if the recess 4 is placed adjacent the bottom of the button 3 the said dividing line will be further away from the center 10. In this manner the dividing line may be positioned in any desired relation with the center 10. Another point of interest as shown diagrammatically in Fig. XV is that the optical center 12 of the reading segment 5 may be placed in any desired relation with the dividing line 11 and center 10 of the major portion 2, that is, it may be placed above the dividing line 11 as shown at 13, on the dividing line as shown at 14, below the dividing line as shown at 15, to the left of the segment 5 as shown at 16 and to the right of said segment as shown at 17. This is controlled by first locating the position of the optical center 12 prior to the forming of the curved surface 6 on the button 3 and segment 5 as described above. After the position of the center has been properly located and marked upon the composite button, that is the combined button 3 and segment 5, the curve 6 is formed with its axial line passing through this marked center. This places the optical axis of the reading segment 5 on the line passing through the center desired. Although the optical center 12 of the reading segment 5 of the lens is described as being located on the button 3 and segment 5 previous to its being fused within the countersink 7 of the major portion 2 it is to be understood that the position of this center may be varied or located where desired after the segment 5 has been fused within the recess 4 as shown diagrammatically by the dotted lines in Fig. XIII. By grinding the curve at an angle to the countersunk surface of the major portion 2 as shown by the dotted line 19, it is apparent that the center or axis of the reading segment 5 will be nearer the dividing line 11 and if formed at the angle shown along the dotted line 20 it will be located further away from the dividing line 11. By the proper selection of the angle of the curve 8 it is apparent that the optical center of the reading segment may be placed where desired.

It is to be understood that the above methods set out in the controlling of the position of the dividing line 11 with respect to the center 10 of the major portion 2 and the controlling or varying of the position of the optical center 12 of the reading segment 5 are simply by way of illustration and that applicant does not desire to restrict himself to these particular methods as it is apparent that many variations may be employed.

By referring to Figs. XXII to XXVII inclusive, it will be seen the optical center of the segment may be related in any desired relation to the center of the major blank, that is above, below or on the dividing line between the segment and major blank. The position of the dividing line may be also fixed as desired.

The major portion 2—the button 3 and the segment 5 may be formed in all of the various combinations of glass shown in the prior art—that is to say a low index crown for the major portion 2 and the button 3—and a high index glass such as flint glass for the segment. If it is desired to reduce color aberrations due to a difference in dispersion between the glasses, a high index barium crown glass may be substituted for the flint in the segment 5. It is clear that any desired combination with known glasses can be made keeping in mind the index of refraction for optical power considerations, the dispersion for color considerations, the melting temperatures for fusing considerations and the co-efficient of expansion also for fusing considerations, these combinations being well known and employed in the prior art.

A limited number of desirable combinations are set forth herein below by way of illustration. Various other combinations may be made to meet the special requirements considered desirable for particular uses or forms of lenses:—

Crown glass having a refractive index of say 1.50 to 1.55 and a reciprocal relative dispersion of 57 to 60 for the distance portion or major blank of the lens and flint glass having a refractive index of 1.61 to 1.70 and a reciprocal relative dispersion of 36 to 30. This combination will give a large resultant chromatic aberration but is the more common type of glass.

Crown glass having a refractive index of 1.50 to 1.55 and a reciprocal relative dispersion of 56 to 60 in combination with barium crown glass having a refractive index of 1.61 to 1.69 and a reciprocal relative dispersion of 56 to 47. The resultant chromatic aberration of this combination will be small.

High dispersion crown glass for the major portion 2 say of 1.50 to 1.55 having a reciprocal relative dispersion of 50 to 55 and barium crown for the reading segment having a refractive index of 1.61 or higher and a reciprocal relative dispersion of 56 or higher. This combination will give a resultant chromatic aberration of less than a single vision lens of the same reading power.

Barium crown glass is here used to designate any glass having a high index of refraction which corresponds in value to flint glass and having a reciprocal relative dispersion which is more than those of the ordinary flint but which approaches or exceeds those of ordinary crown glass.

The above values and combinations set up are simply as means of illustration of how a lens having a minimum amount of chromatic aberration may be obtained. It is to be understood that the refractive indexes of the major and minor portions of the lens herein described and the reciprocal dispersions set forth above need not be rigidly adhered to and that many variations may be used in forming the above lenses.

The shapes set out in the drawings are simply by way of illustration of how various shaped segments 5 can be obtained and how segments of varying sizes may be obtained and are not intended to restrict applicant in any way to the particular shapes and sizes of segments shown.

As stated above, the optical center of the reading segment 5 may be placed in any desired relation with respect to the center of the major portion 2 and the dividing line 11 may be located in any desired relation with respect to the center 10 of the major portion and the optical center 12 of the minor portion or reading segment 5.

It is apparent that the major portion 2, minor button 3 and segment 5 can all be of a different refractive index if desired. In this manner a lens having a distance field, a reading field and an intermediate field surrounding the reading field may be formed or other different combinations may be made.

In Fig. XXI there is shown a further modification of the invention wherein instead of forming a slight depression 4 in the button 3 a recess 21 is formed therethrough. The remaining steps of the process are the same. It is apparent that the depression 4 or recess 21 may be formed in the button 3 by moulding, cutting, grinding or some similar operation.

It will be understood that wherever the term "multifocal" is employed in the specification or claims herein, that it refers to a bifocal lens as well as other lenses having more than one focal field. It will also be understood that the use of the invention and device described herein will be mainly in connection with bifocal lenses, the greater bulk of the lenses to which this invention will be applied being bifocal lenses; only a small percentage will be trifocals or lenses of more than two focal fields.

From the foregoing description it will be seen that applicant has provided simple, efficient and economical means of obtaining a lens wherein the size, shape and position of the optical center of the reading segment may be definitely controlled without introducing serious disadvantages and difficulties in obtaining a finished lens of a high standard and has particular reference to an improved process of making same. It will further be clear that the cost of production has been reduced by using a molding or heat process for certain operations instead of the more expensive grinding and polishing operations of the prior art and that the difficulty of fusing the abutting edges of composite buttons has been avoided thus making it possible to make a lens of less price with optical qualities superior to those of the prior art.

Having described my invention I claim:

1. The process of forming a lens blank for a fused bifocal or multifocal lens comprising forming a major blank with a countersink therein, forming a button insert by placing a gob of plastic glass in a mould having a depression in one surface thereof of substantially the size and shape of the reading segment of the lens, pressing a die of substantially the same size and shape as the depression into the gob of glass opposite the depression to displace a portion of said glass laterally to form a depression of substantially the size and shape of the reading segment in one side of the glass and a projection of substantially the same size on the other side of the glass, shaping a piece of glass of a different refractive index to fit in the depression in the first piece of glass, securing said shaped piece of glass in the depression, forming a continuous optical surface of substantially the same curvature as the countersink in the major blank over the depression side of said first piece of glass and the exposed side of said second piece of glass, placing the composite button insert in the countersink in the major blank, and fusing it therein.

2. The process of forming a multifocal or bifocal lens comprising forming a major blank with a countersink therein, forming a button insert by placing a gob of glass in a mould having a depression in one surface thereof of substantially the size and shape of the reading segment of the lens, pressing a die of substantially the same size and shape as the depression into the gob of glass opposite the depression to displace a portion of said glass laterally to form a depression of substantially the size and shape of the reading segment in one side of the glass and a projection of substantially the same size on the other side of the glass, shaping a piece of glass of a different refractive index to fit in the depression in the first piece of glass, securing said shaped piece of glass in the depression, forming a continuous optical surface of substantially the same curvature as the countersink in the major blank over the depression side of said first piece of glass and the exposed side of said second piece of glass, placing the composite button insert in the countersink in the major blank, fusing it therein, grinding away the projecting portions of said button insert and forming a continuous optical surface over said button insert and the countersink side of the major blank, and forming a continuous optical surface over the opposite side of the major blank to produce a finished lens.

3. The method of making bifocal or multifocal lens blanks which comprises grinding a countersink in a major blank of glass having the desired index of refraction, making a button of a piece of glass of substantially the same index of refraction as that of the major blank to fit into said countersink, displacing a portion of the glass of said button in a direction substantially normal to the plane thereof by an amount less than the thickness of the glass whereby a depression is formed in one side of said button and a projection on the other side of said button without visibly distorting the striations of the glass of the button, placing an insert in said depression having the desired index of refraction, different from that of the major blank, fusing said insert in said depression, surfacing off the face of the button and insert to a curved surface to fit the countersink of the major portion, grinding off the projection leaving a thin protective layer of glass over said insert, said layer having its outer wall substantially parallel to the bottom of said insert and fusing said button and insert to said major blank with the insert lying between the countersink surface of the major blank and the thin protective layer of the button.

4. The method of making bifocal or multifocal lens blanks which comprises grinding a countersink in a major lens blank of glass having the desired index of refraction, making a button of a piece of glass of substantially the same index of refraction as that of the major blank to fit into said countersink, displacing a portion of the glass of said button in a direction substantially normal to the plane thereof by an amount less than the thickness of the glass whereby a depression is formed in one side of said button and a projection on the other side of said button without visibly distorting the striations of the glass of the button, placing an insert in said depression having the desired index of refraction, different from that of the major blank, fusing said insert in said depression, surfacing off the face of the button and insert to a curved surface to fit the countersink of the major blank, grinding off the projection leaving a thin protective layer of glass over said insert, said layer having its outer wall substantially parallel to the bottom of said insert, fusing said button and insert to said major blank with the insert lying between the countersink surface of the major blank and the thin protective layer of the button and forming a continuous surface over the major blank, and composite button and to such a depth as to remove the protective layer and expose the insert.

5. The method of making bifocal or multifocal lenses which comprises grinding a countersink in a major lens blank of glass having the desired index of refraction, making a button of a piece of glass of substantially the same index of refraction as that of the major blank to fit into said countersink, displacing a portion of the glass of said button in a direction substantially normal to the plane thereof by an amount less than the thickness of the glass whereby a depression is formed in one side of said button and a projection on the other side of said button without visibly distorting the striations of the glass of the button, placing an insert in said depression having the desired index of refraction, different from that of the major blank, fusing said insert in said depression, surfacing off the face of the button and insert to a curved surface to fit the countersink of the major blank, grinding off the projection leaving a thin protective layer of glass over said insert, said layer having its outer wall substantially parallel to the bottom of said insert, fusing said button and insert to said major blank with the insert lying between the countersink surface of the major blank and the thin protective layer of button and forming a continuous surface over the major portion and composite button and to such a depth as to remove the protective layer and expose the insert and forming the desired prescriptive curve on the opposite side of the lens.

6. The method of making bifocal or multifocal lens blanks which comprises forming a countersink in a major blank of glass having a desired index of refraction, forming a button of a piece of glass of substantially the same index of refraction as that of the major blank to fit into said countersink, displacing a portion of the glass of said button to substantially an equal depth throughout the area of displacement and by an amount less than the thickness of the glass to form a depression in one side of said button with angled side walls of substantially equal depth throughout the contour of the depression and with a wall of substantially the same thickness throughout the area of the bottom of the depression, placing an insert of substantially the same contour shape as the depression in said depression having the desired index of refraction, different from that of the major blank, securing said insert in said depression, forming the face of the button and insert to a curved surface to be placed in the countersink of the major portion, and fusing said button and insert to said major blank with the insert lying between the countersink surface of the major blank and the wall adjacent the bottom of the depression in the button, the said wall being adapted to provide a protective layer over the insert in the depression during fusion.

7. The method of making bifocal or multifocal lens blanks which comprises forming a countersink in a major piece of glass having the desired index of refraction, forming a minor portion of glass of substantially the same index of refraction as that of the major piece of glass to be secured in said countersink, displacing a portion of the glass of said minor portion in a direction substantially normal to the plane thereof by an amount less than the thickness of said minor portion whereby a depression is formed in one side of said minor portion and a projection on the other side of said minor portion without visibly distorting the striations of the glass of said minor portion, placing an insert in said depression having a desired index of refraction different from that of the major piece of glass, securing said insert in said depression, and shaping the face of the minor portion and insert to a curved surface, removing the projection, leaving a relatively thin protective layer of glass over said insert, said layer having its outer wall substantially parallel to the bottom of said insert and securing said minor portion and insert to said major piece of glass with the insert lying between the countersink surface of the major piece of glass and the relatively thin protective layer of the minor portion.

HARRY W. HILL.